Jan. 23, 1934.  F. E. GULICK  1,944,601
DENTAL DIMENSIONATOR
Filed July 29, 1932
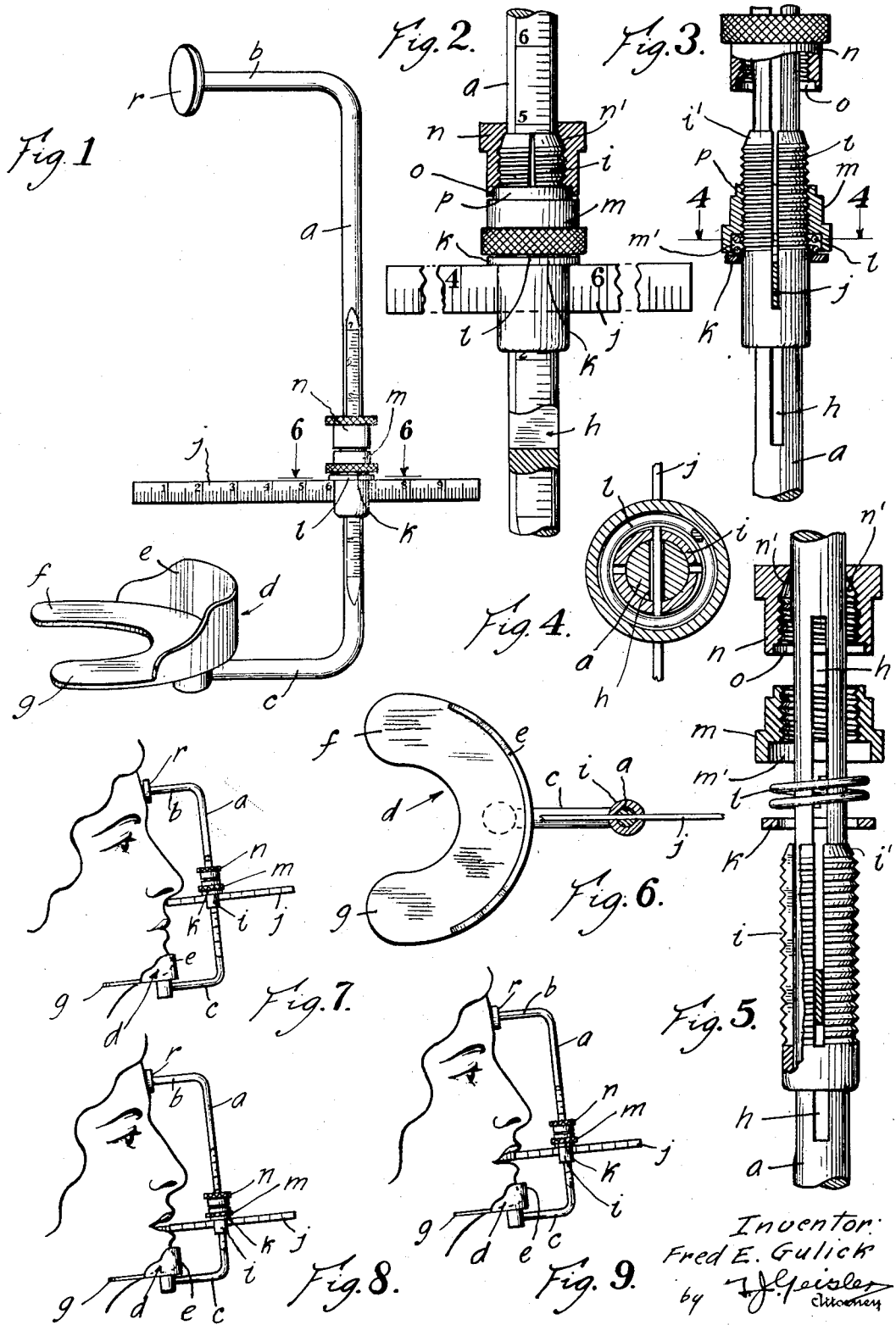
Inventor:
Fred E. Gulick Patented Jan. 23, 1934

1,944,601

UNITED STATES PATENT OFFICE 1,944,601

DENTAL DIMENSIONATOR

Fred E. Gulick, Portland, Oreg.

Application July 29, 1932. Serial No. 626,018

4 Claims. (Cl. 33—174)

One of the greatest sources of dissatisfaction among the wearers of dentures is the complete change of the expression in the lower third of the face. This change is apt to occasion more or less disfiguring wrinkles.

But present day dentistry has learned that by making and keeping a record of certain facial measurements before the natural teeth are extracted, it is possible, by the record of these measurements after the artificial teeth are put in to establish and maintain the same relative distance from the chin to the nose, as well as the labial-incisal edge position of the anterior teeth as existed in the natural dentures. Such records are further very valuable for future reference, when the denture has been in the mouth of the wearer for several years and absorption has taken place, making re-basing necessary.

In order to facilitate the making of such measurements, I have invented an instrument simple in construction, and adapted by lightness, and handiness in operation to faciliate its use.

The details of construction of my instrument and the procedure therewith for making, with its aid, the said measurements, are hereinafter fully described with reference to the accompanying drawing.

In the drawing:

Fig. 1 shows a perspective elevation of my dental dimensionator;

Figs. 2 and 3 show enlarged fragmental views, partly in section, of the bar or shank, and the movable parts of my instrument, to illustrate the arrangement of such parts, and incidentally the means by which adjustments of the measuring elements of my instrument are secured in place. Fig. 3 is taken in a plane at right angles to the plane in which Fig. 2 is shown;

Fig. 4 is a cross section taken on the line 4—4 of Fig. 3;

Fig. 5 shows a sectional elevation of the shank, and parts thereby carried as shown in Fig. 3, arranged in the same plane, as in the latter figure, but with the parts separated from each other, so as to illustrate their individual construction more clearly;

Fig. 6 shows a top plan-section taken on the line 6—6 of Fig. 1, more particularly showing the chin-piece; and Figs. 7 to 9, inclusive, show, respectively, in the order named, the application of my dental dimensionator for measuring the distance from chin to nose, or the intermaxillary space; for determining the incisal edge position of the upper centrals; and for measuring the anterior protrusion, or labial position of the upper centrals.

My instrument consists of a shank $a$, the upper and lower extremities, $b$, $c$ of which are bent at right angles in the same direction, and in the same plane. The end of the upper extremity is provided with a rest $r$. The lower extremity is provided with a chin-piece $d$ comprising a bar, or plate, having a perpendicular flange $e$, and lateral, opposite extensions $f$, $g$. The shank is provided with a longitudinal slot $h$. On the shank is slidably mounted a sleeve $i$, the upper portion of which is threaded and split, preferably having a four-way split, as shown by Fig. 4, thereby adapting the upper, split, threaded portion of the sleeve $i$ to be compressed by screwing down on it a sleeve securing nut $n$, thus clamping it in place on the shank $a$ in the position to which it is adjusted.

One of the slits of the split sleeve $i$ is placed in registration with the slot $h$ of the shank, and in such registering slit and slot is inserted a graduated perpendicular ruler, or scale $j$, which thus is movable longitudinally, and up and down relatively to the shank $a$.

The upper end of the sleeve $i$ is tapered as at $i'$. On the sleeve $i$ is loosely mounted a ring $k$.

Over said ring $k$ is placed an expansion coil-spring $l$. Over the plate $k$ is threaded, on the sleeve $i$, a scale-securing nut $m$, recessed at the base, as at $m'$, to provide a space, or housing, in which to receive the expansion coil-spring $l$.

The sleeve securing nut $n$ is threaded on the sleeve $i$ over the scale-securing nut $m$. The nut $n$ has an interior taper corresponding to the taper of the upper end of the sleeve and recessed as at $o$, so as to fit over and form a neat joint with the boss $p$ provided on the upper end of the scale securing nut $m$, and the upper portion is provided with a conical internal recess $n'$ adapted to receive the conical end of the sleeve $i$.

In operating with my instrument the chin-piece $d$ is placed against the under surface of the chin and the rest $r$ at the end of the upper extremity of the shank is caused to bear against the forehead, to steady the instrument. The teeth of the patient having been tightly closed, the dental operator holds the instrument with the chin-piece firmly set against the chin. The scale securing nut $m$, also the sleeve securing nut $n$, being released, the sleeve is adjusted on the shank so as to bring the scale up to the lower border of the nose and into contact with the nasal septum. The calibrations on the shank are then read to measure the distance from the chin to the nose or intermaxillary space, such operation being illustrated by Fig. 7.

A similar procedure is followed for determining the incisal edge position of the upper centrals, the operation of which is illustrated by Fig. 8. For measuring the anterior protrusion or labial position, illustrated by Fig. 9, I arrange the scale to come into contact with labial surface of upper central incisors and read the calibration thereon, thereby registering the correct labial position of these teeth.

In operating with my instrument, the perpendicular scale $j$ is arranged to bear on the bottom of the slot $h$ of the sleeve $i$, with the loose ring $k$ bearing on the scale as shown by Fig. 2. The scale $j$ having been properly adjusted, the scale-securing nut $m$ is screwed down firmly on the ring $k$ to secure the scale $j$ in place; and finally, after the sleeve $i$ has been properly positioned, the sleeve securing nut $g$ is screwed down firmly on the scale-securing nut $m$, and in that way the movable devices are fixed in place so that the measurement made may be recorded. Thereupon the sleeve $l$ and scale $j$ may again be released for the taking of a further measurement.

I claim:

1. A dental dimensionator comprising, an elongate calibrated slotted shank, the lower extremity of the shank being provided with a chin-piece, a slitted compressible sleeve slidable on said shank, a scale arranged perpendicular to the shank and adjustable longitudinally and transversely in the slot thereof, a ring loose on the compressible sleeve over the scale, a spring seated on said ring, a nut threaded on the sleeve over the spring and means for clamping the sleeve in place as adjusted on the shank.

2. A dental dimensionator comprising, an elongate calibrated shank provided with a longitudinal slot, the lower extremity of the shank being provided with a chin-piece comprising a plate having a perpendicular guide flange and opposite lateral extensions therefrom, a slitted compressible sleeve slidable on said shank, a scale arranged perpendicular to the shank and slidable in the said slot thereof and in the registering slit of the said sleeve, a ring loose on the sleeve over the scale, a spring seated on said loose ring, a nut threaded on the sleeve over the said spring and a lock nut threaded on the sleeve over the first mentioned nut, adapted to clamp the slitted sleeve on the shank.

3. A dental dimensionator comprising, an elongate calibrated shank having its upper and lower extremities bent at right angles in the same direction and in the same plane and provided with a longitudinal slot, the lower extremity of the shank being provided with a chin-piece comprising a plate having a perpendicular guide flange and opposite lateral extensions therefrom, a slitted compressible sleeve slidable on said shank, the top of said sleeve being tapered, a scale arranged perpendicular to the shank and longitudinally slidable in the slot thereof and in the registering slit of the said sleeve, a ring loose on the sleeve over said scale, a spring seated on said loose ring, a scale-securing nut threaded on the sleeve over the spring and adapted to house the latter, and a nut threaded on the sleeve over said scale-securing nut, the latter nut having a taper at one end of its bore adapted to coact with the tapered top of the sleeve to clamp the slitted portion of the sleeve on the shank.

4. In a dental dimensionator, an elongate calibrated shank provided with a longitudinal slot, the lower extremity of the shank being provided with a chin-piece, a slitted compressible sleeve slidable on said shank, a scale arranged perpendicular to said shank and longitudinally slidable in the slot thereof and in the registering slit of said sleeve, and means for securing the scale in the sleeve, and the latter on the shank in place as adjusted.

FRED E. GULICK.